UNITED STATES PATENT OFFICE.

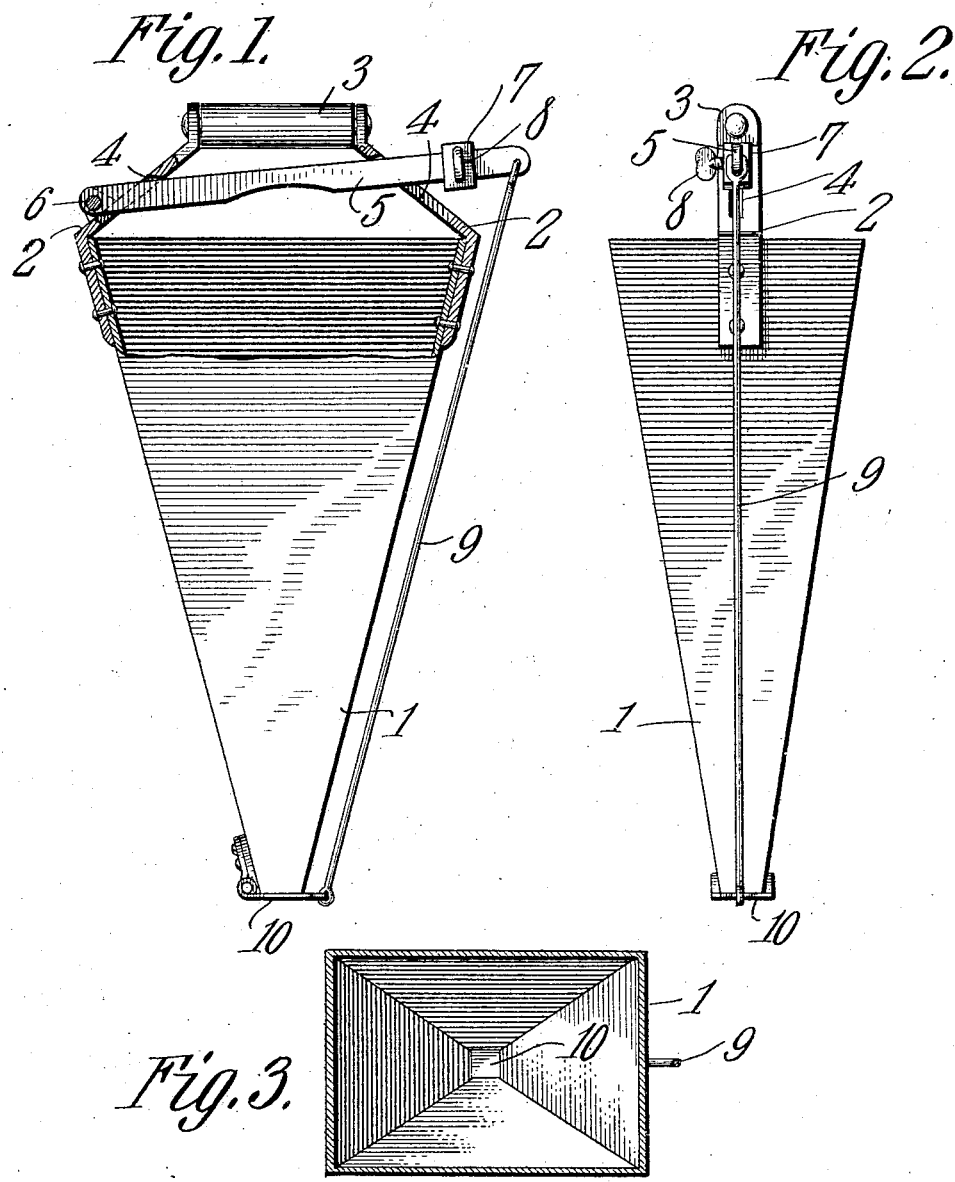

JOHN T. FLIPPEN, OF GREYSTONE, VIRGINIA.

HAND FERTILIZER-DROPPER.

No. 883,796.  Specification of Letters Patent.  Patented April 7, 1908.

Application filed August 17, 1907. Serial No. 389,018.

*To all whom it may concern:*

Be it known that I, JOHN T. FLIPPEN, a citizen of the United States, residing at Greystone, in the county of Henry and State of Virginia, have invented a new and useful Hand Fertilizer-Dropper, of which the following is a specification.

This invention has relation to hand fertilizer droppers and it consists in the novel construction and arrangement of its parts as hereinafter shown and described.

The object of the invention is to provide a portable fertilizer dropper in the form of an elongated pyramidal bucket or receptacle with a swinging valve at its lower reduced end and a lever fulcrumed adjacent the handle of the bucket and being connected with said valve and having adjustable means for limiting the movement of the lever.

In the accompanying drawing:—Figure 1 is a side elevation of the bucket partly in section. Fig. 2 is a side elevation of the bucket, at right angles to the view shown in Fig. 1, and Fig. 3 is a transverse sectional view of the bucket.

The dropper consists of the pyramidal bucket or receptacle 1 which is open at its opposite ends. The upper larger end is provided with the ears 2, 2 which are connected together by the handle 3. Each ear 2 is provided with an opening 4 and the lever 5 passes through said openings and lies under the handle 3 transversely across the end of the bucket. The lever 5 is fulcrumed, as at 6, to one of the ears 2 and its opposite end portion is provided with an adjustable stop 7 which is held in place upon the said lever by means of a set-screw 8. The upper end of the rod 9 is pivotally connected to the swinging end of the lever 5 and the lower end of said rod is pivotally connected to a valve 10 which is hinged at the lower end of the bottom 1 and through the instrumentality of the said rod is caused to swing simultaneously with the lever 5 and in the same direction.

In operation the bucket is filled with fertilizer and the operator carries the same along the row to be fertilized and at intervals swings the lever 5 which moves the valve 10 and prevents the fertilizer from packing. The stop 7 is first adjusted in order to regulate the swing of the valve 10 whereby the quantity of fertilizer deposited is regulated. In case it should be desired to retain the fertilizer in the bucket without depositing the same the operator will carry the bucket by passing his hand under the lever 5 when the valve 10 will be held closed against the lower end of the bucket, also, while the bucket is carried in one hand a finger of the same hand may be used to move the lever 5 to operate the valve 10.

Having described my invention what I claim as new and desire to secure by Letters-Patent is:—

1. A bucket open at its opposite ends, a valve located at the lower end of the bucket, a handle attached at the opposite end of the bucket, a lever fulcrumed upon the handle and being operatively connected with said valve.

2. A fertilizer distributer consisting of a bucket, a valve located at the lower end thereof, a handle attached at the opposite end, a lever fulcrumed at the handle end of the bucket being operatively connected to said valve.

3. A fertilizer dropper consisting of a bucket having opposite open ends, a valve located at the lower end of the bucket, a handle located at the opposite end thereof, a lever fulcrumed at the handle end of the bucket and being operatively connected with said valve and an adjustable means for regulating the swing of the lever.

4. A fertilizer dropper comprising a bucket having open ends, a valve hinged at the lower end, a lever fulcrumed at the opposite end and a rod connecting the lever with the valve.

5. A fertilizer dropper comprising a bucket having open ends, a valve hinged to the lower end, a lever fulcrumed to the opposite end, and a rod connecting the lever with the valve.

6. A fertilizer dropper comprising a bucket having open ends, a valve located at the lower end, a handle located at the opposite end and having side ears provided with openings, a lever passing through the openings, and a rod connecting said lever with the valve.

In testimony that I claim the foregoing as my own, I have hereto affixed my signature in the presence of two witnesses.

JOHN T. FLIPPEN.

Witnesses:
JOHN W. SIMMONS,
W. O. MENTER, Jr.